(12) United States Patent  
Kern (10) Patent No.: US 7,475,890 B1
(45) Date of Patent: Jan. 13, 2009

(54) CAMBER AND CASTER ADJUSTMENT TOOL

(76) Inventor: Dewayne A. Kern, P.O. Box 876972, Wasilla, AK (US) 99687

( * ) Notice: Subject to any disclaimer, the term of this patent is extended or adjusted under 35 U.S.C. 154(b) by 525 days.

(21) Appl. No.: 11/069,276

(22) Filed: Mar. 1, 2005

(51) Int. Cl.
*B60G 7/02* (2006.01)

(52) U.S. Cl. .................................. 280/86.751

(58) Field of Classification Search ............ 280/86.751, 280/86.75, 86.755, FOR. 112; 403/4, 408.1
See application file for complete search history.

(56) References Cited

U.S. PATENT DOCUMENTS 3,807,693 A * 4/1974 Castoe ........................... 254/1
3,840,211 A * 10/1974 Castoe ......................... 254/131
6,367,826 B1 * 4/2002 Klais ...................... 280/86.751

\* cited by examiner

*Primary Examiner*—Faye M. Fleming
(74) *Attorney, Agent, or Firm*—Michael J. Tavella (57) ABSTRACT

A spreading device designed for adjustment of camber and or caster on vehicles with control arms. The tool has a housing with fingers that extend from the top of one end of the body. A bolt passes through a hole in the housing. A foot is attached to the bolt. The foot has a tongue that extends out the top of the housing. The tool is placed between the vehicle's frame and a control arm. The bolts that retain the control arm are loosened. The threaded rod on the tool is then tightened causing the control arm to be pushed away from the frame. Once the desired steering angles are reached, the control arm retaining bolts are tightened and the tool can be loosened and removed. If two tools are used it is possible to adjust caster without affecting camber or to adjust the camber without affecting the caster.

17 Claims, 10 Drawing Sheets

CAMBER AND CASTER ADJUSTMENT TOOL

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to an adjustment tool of camber and or caster on vehicles and particularly to with an adjustment tool of camber and or caster on vehicles independent suspension consisting of an upper and lower control arm.

2. Description of the Prior Art

Modern vehicles have complex steering mechanisms. These mechanisms are designed to move the front wheels of the vehicle in a coordinated manner to move the vehicle in a desired direction. The steering mechanisms include rods and control arms that hold the wheels in the proper position for safe steering and to maintain uniform tire wear.

Two parameters that ensure proper operation of the vehicle include camber and caster. The term camber refers to the alignment of the wheels relative to the vertical. Proper adjustment of camber is required to insure proper contact of the tire tread with the road surface. Positive camber refers to a condition in which the wheels are tilted outwardly at the tops thereof and negative camber where the wheels are tilted inwardly. Improper camber will adversely affect the performance of a vehicle, resulting in uneven tire wear, and may be a source of a possible road hazard due to loss of traction.

Caster refers to the angle formed by the steering pivot. When the steering wheel is turned, the front wheels respond by turning on a pivot attached to the suspension system. Caster is the angle of this steering pivot, measured in degrees, when viewed from the side of the vehicle. If the top of the pivot is leaning toward the rear of the car, then the caster is positive, if it is leaning toward the front, it is negative. If the caster is out of adjustment, it can cause problems in straight-line tracking. If the caster is different from side to side, the vehicle will pull to the side with the less positive caster. If the caster is equal but too negative, the steering will be light and the vehicle will wander and be difficult to keep in a straight line. If the caster is equal but too positive, the steering will be heavy and the steering wheel may kick when you hit a bump. Caster has little affect on tire wear.

There have been many tools designed to adjust the camber and caster for different types of vehicles. These tools are used to adjust the various arms and rods that make up the steering system. In the case of vehicles that have independent suspension that use an upper and lower control arm, there is no tool to easily adjust these control arms. The problem with these arms is that to adjust them, the retaining bolts must be loosened, the arm moved to the proper position and then the bolts must be retightened. Once the bolts are loosened, it is difficult to move the arm precisely and then have it retain the new position while the bolts are retightened.

BRIEF DESCRIPTION OF THE INVENTION

The instant invention overcomes these problems. It is a spreading device designed for but not limited to, the adjustment of camber and or caster on vehicles with independent suspension consisting of an upper and lower control arm.

The tool consists of a main body, approximately rectangular, that has two fingers that extend at a right angle from the top of one end of the body. The body has a hole in the other end. A threaded rod passes through the hole and sits in the housing. The threaded rod also passes through a block. The block has dovetail sides that ride in grooves in the body. The block also has a foot extending upward at an angle of approximately 80 degrees. The block sits in the housing and moves by turning the threaded rod.

The tool is made to be placed between the vehicle's frame and the control arm that requires adjustment with the suspension loaded. The bolts that retain the control arm are then loosened allowing the control arm to rest on the tool. The threaded rod on the tool is then tightened causing the control arm to be pushed away from the frame. Once the desired steering angles are reached, the control arm retaining bolts are tightened and the tool can be loosened and removed. If two tools are used together (one tool on each end of the control arm), is possible to adjust caster without affecting camber or vice versa.

DETAILED DESCRIPTION OF THE INVENTION

Figure 1:
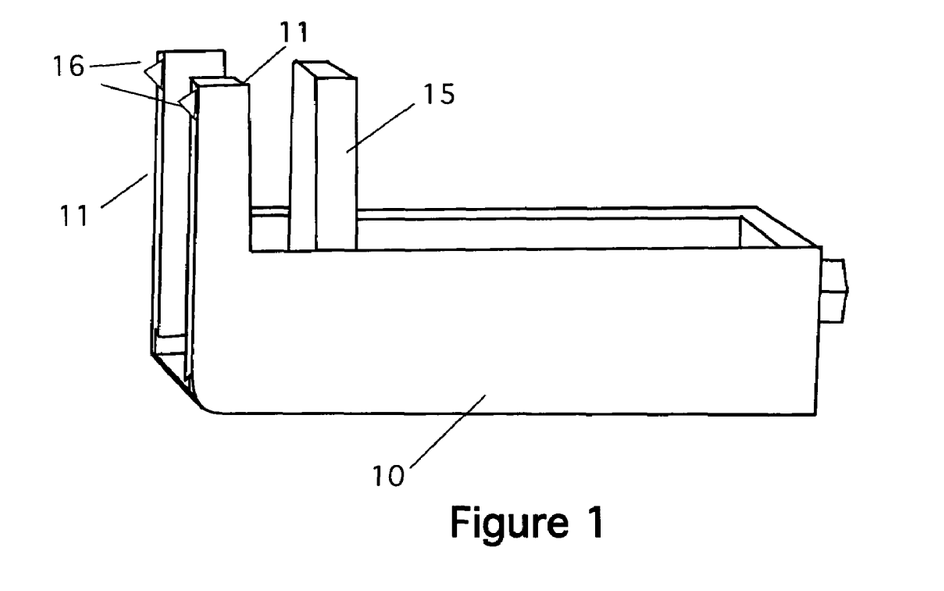
FIG. 1 is a side, front perspective view of the first embodiment of the invention.
Figure 2:
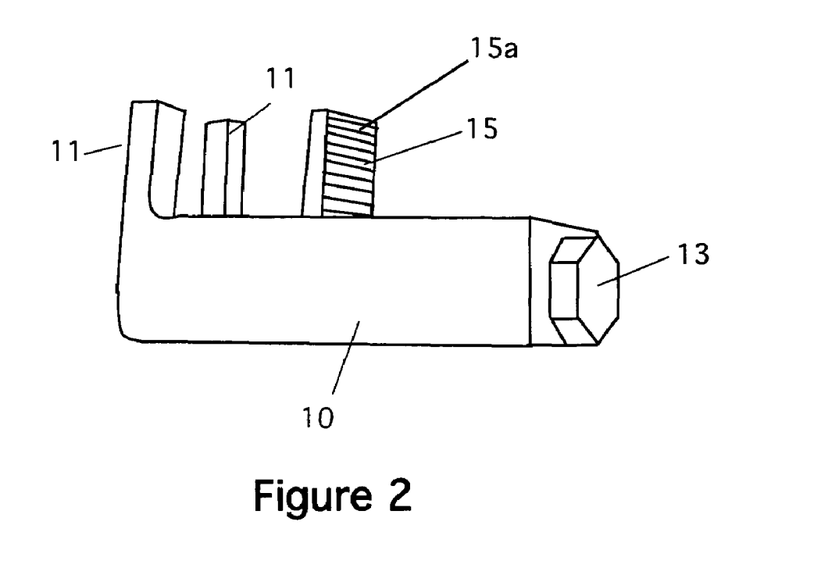
FIG. 2 is a side, rear perspective view of the first embodiment of the invention.

Referring now to FIG. 1, the first embodiment of the tool 1 consists of a main body 10 that has two fingers 11 that extend at a right angle from the top of one end of the body. The body 10 has a hole 12 (see FIG. 3) in the other end. A threaded rod (or bolt) 13 passes through the hole and sits in the housing. The housing has an open interior forming a large slot as shown. A sliding foot 14 with a tongue 15 is attached to the threaded rod. The foot is positioned within the slot formed in the block, as discussed below. It extends out the top of the housing at an 80-degree angle as shown in FIG. 2. The fingers 11 can have hardened points 16 formed on them as shown to ensure that the tool grips and holds the frame surface securely. The tongue 15 can have a series of teeth 15a to help grip a workpiece better.

Figure 3:
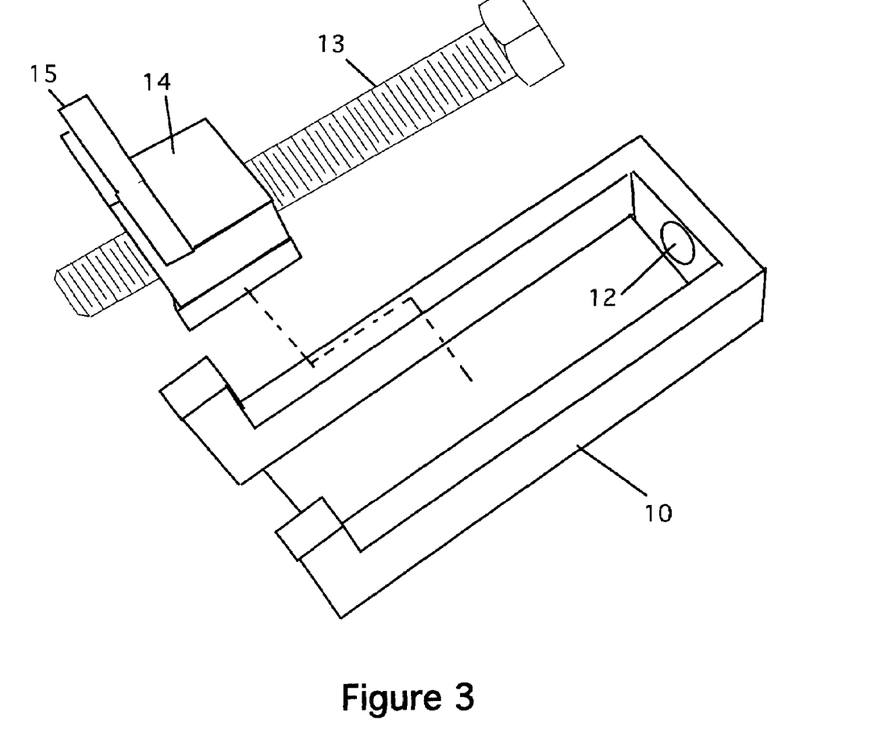
FIG. 3 is a partially disassembled view of the first embodiment of the invention.

FIG. 3 shows the interior of the housing 10 and the hole 12. It also shows the threaded rod or bolt 13 installed in the foot 14. Normally, of course, the bolt 13 passes through the hole 12 before it is attached to the foot.

Figure 4:
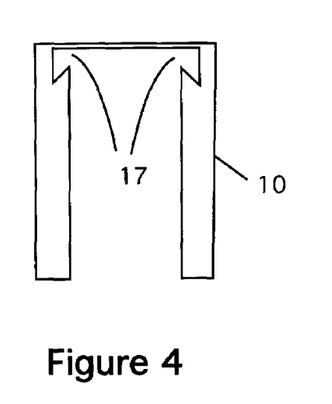
FIG. 4 is a cross-sectional view of the holding frame of the first embodiment of the invention.
Figure 5:
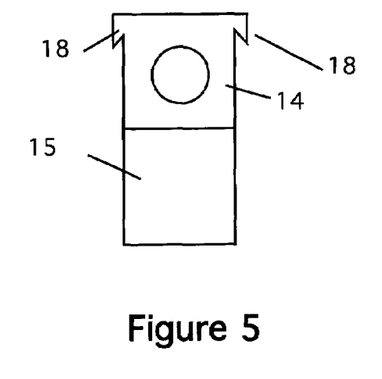
FIG. 5 is a front view of the sliding foot of the first embodiment of the invention.

FIGS. 4 and 5 show cross-section of the housing 10 and foot 14. These figures show a pair of dovetail grooves 17 that are machined or otherwise formed in the top of the housing. These grooves run the entire length of the housing. The foot 14 is shown in FIG. 5. It has a pair of corresponding dovetails 18. In use, the foot is slid into the housing so that the dovetails align with the grooves. The bolt is positioned as discussed above. The dovetails and grooves hold the foot within the housing Note that the position of the housing in FIG. 4 is the position for intended use. In other words, the foot hangs down from the housing in use. The dovetails and grooves are used to keep the foot in position during normal use.

Figure 6:
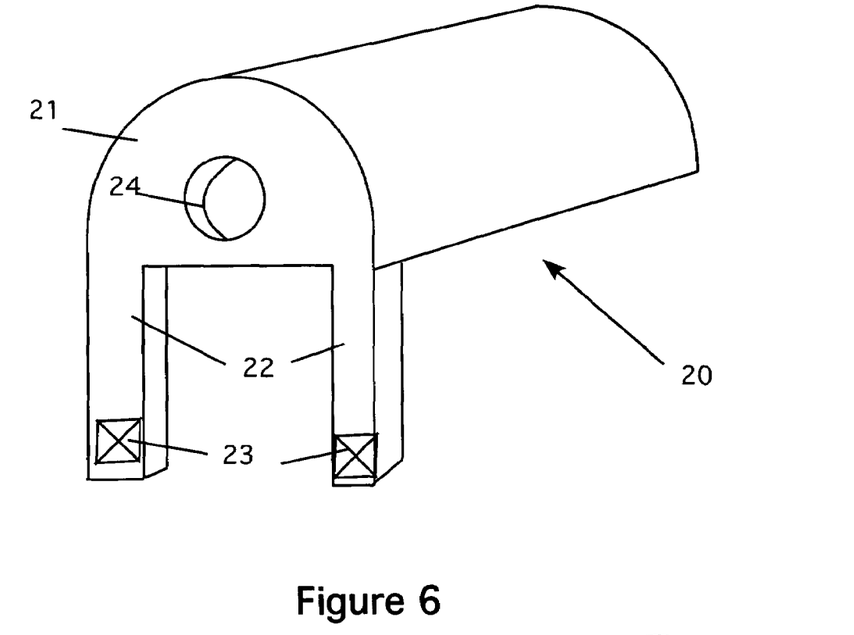
FIG. 6 is a front perspective view of the holding frame of a second embodiment of the invention.
Figure 7:
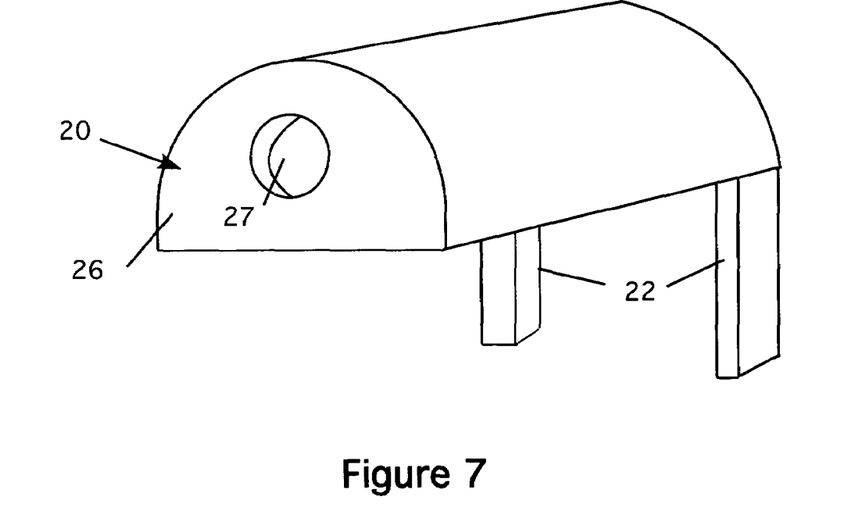
FIG. 7 is a rear perspective view of the holding frame of a second embodiment of the invention.

FIGS. 6 and 7 show a second embodiment 20 of the tool. In this design, the housing 21 has a curved top. This design allows the device to fit into tighter quarters and may be simpler to manufacture. As before, the housing 21 has two fingers 22 that extend down from the top of the housing. Note that these fingers can also have points 23 formed on them to improve the grip of the tool in use. The finger end of the tool has a hole 24 to accommodate a bolt 25. The hole 24 is used to accommodate the tip of the bolt 25 to assist in keeping the bolt and foot in the proper position. FIG. 7 shows the opposite end 26 of the tool. Here, a hole 27 is provided to also hold the bolt in position.

Figure 8:
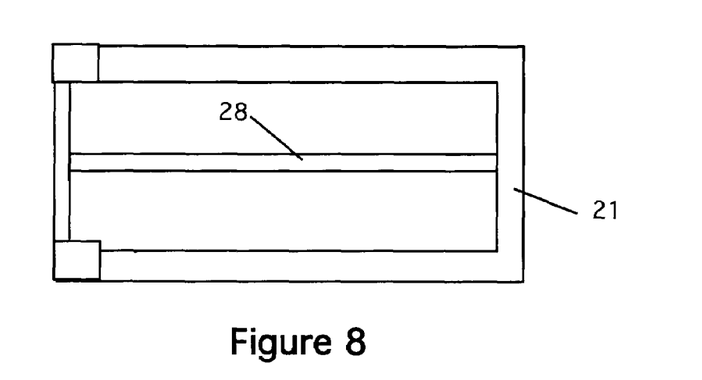
FIG. 8 is a bottom view of the holding frame of the second embodiment of the invention.

FIG. 8 shows the inside of the housing 21. This view shows a groove 28 formed in the top of the housing as shown.

Figure 9:
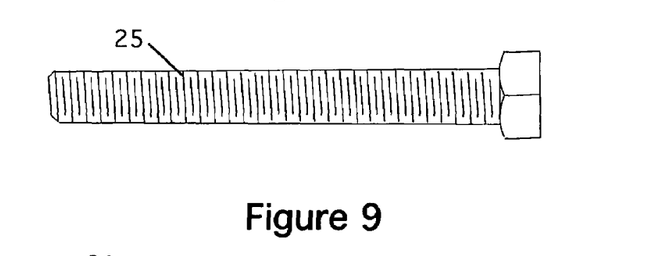
FIG. 9 is a side view of a retaining bolt used in the second embodiment of the invention.

FIG. 9 shows the bolt 25 used in the tool.

Figure 10:
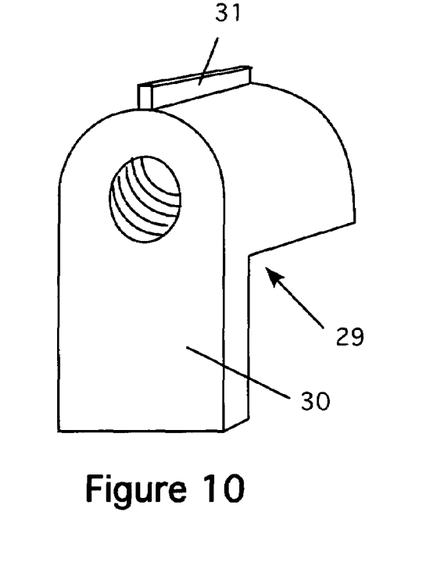
FIG. 10 is a front perspective view of the sliding foot of a second embodiment of the invention.
Figure 11:
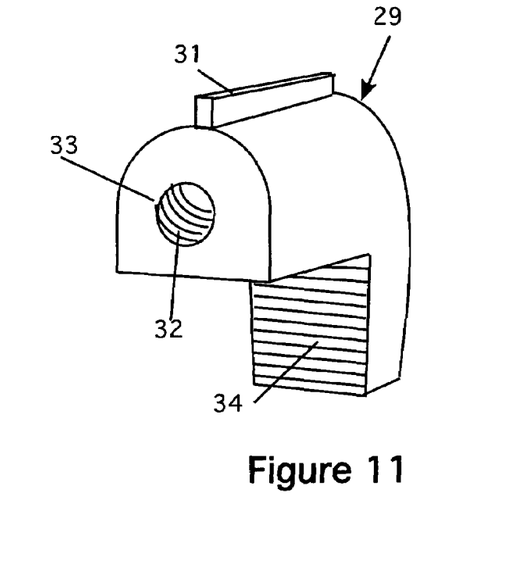
FIG. 11 is a rear perspective view of the sliding foot of a second embodiment of the invention.

FIGS. 10 and 11 show the sliding foot 29 of this embodiment. As shown in FIG. 10, the foot 29 has an "L" shape. The long face 30 of the foot is designed to extend below the housing as in the first embodiment. A tab 31 is formed on the foot 29 as shown. The tab 31 rests in the groove 28. It is used to prevent the foot from twisting while in the housing. A threaded hole 32 is formed in the foot as shown. This hole receives the bolt 25. The threads 33 move the foot in the housing as the bolt is turned.

FIG. 11 shows the face 30 of the foot. The face can have a series of teeth 34 to help grip a workpiece better.

Figure 12:
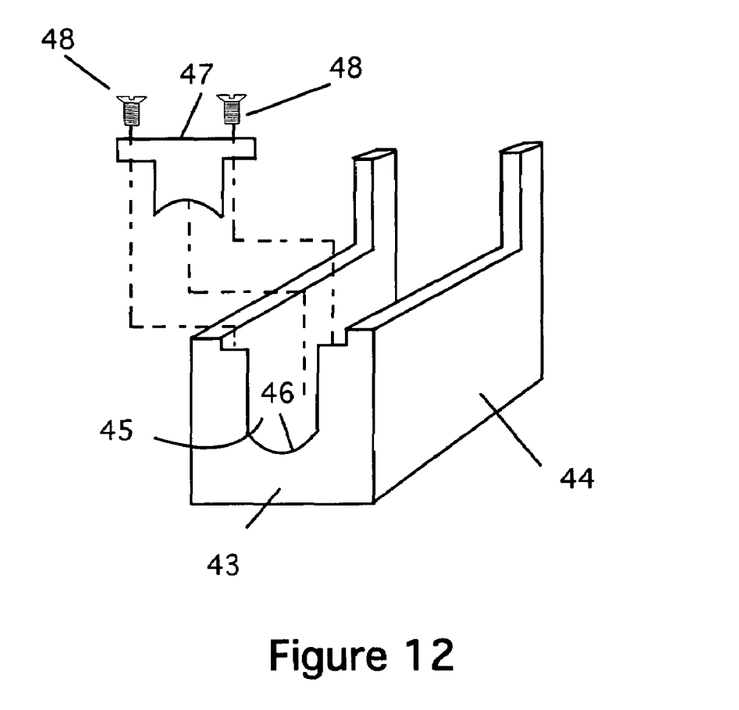
FIG. 12 is a rear perspective view of the first embodiment showing an alternative construction for retaining the bolt.
Figure 13:
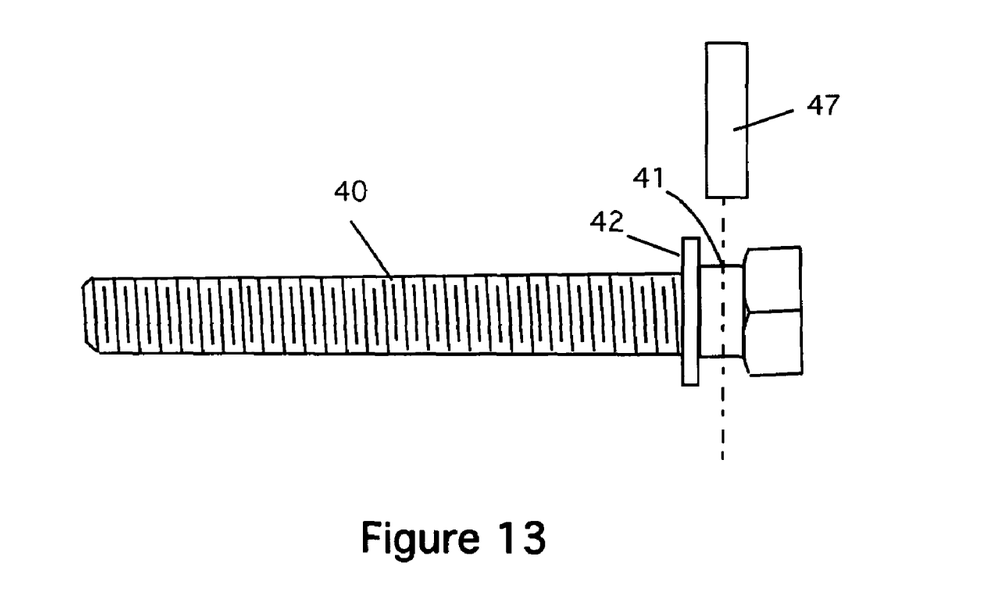
FIG. 13 is a detail of a bolt having a retainer washer and the removable top wall showing the alignment of the bolt with the removable top.

FIGS. 12 and 13 show a modification to the basic design. In this modification, the bolt 40 is formed with a spacing collar 41 and a washer 42. The end 43 housing 44 is modified by making the original bolt hole a slot 45 that permits the bolt with the washer to be placed in the housing. Thus, the bolt 40 is placed so that the collar rests on the curved bottom 46 of the slot 54. A retainer plate 47 is designed to slide into the slot and fit over the collar 41 of the bolt 40 (see, e.g., FIG. 13). The retainer is secured to the housing with screws 48.

This design prevents the bolt from moving out the back of the housing. Without the collar and washer, if the bolt is not held in place, it can cause the sliding foot to become jammed within the housing. To prevent this, the collar design is used. Once installed, the washer prevents the bolt from sliding out the back of the housing.

This design is the preferred way to manufacture the device because it eliminated any jamming problems caused by the free moving bolt.

Figure 14:
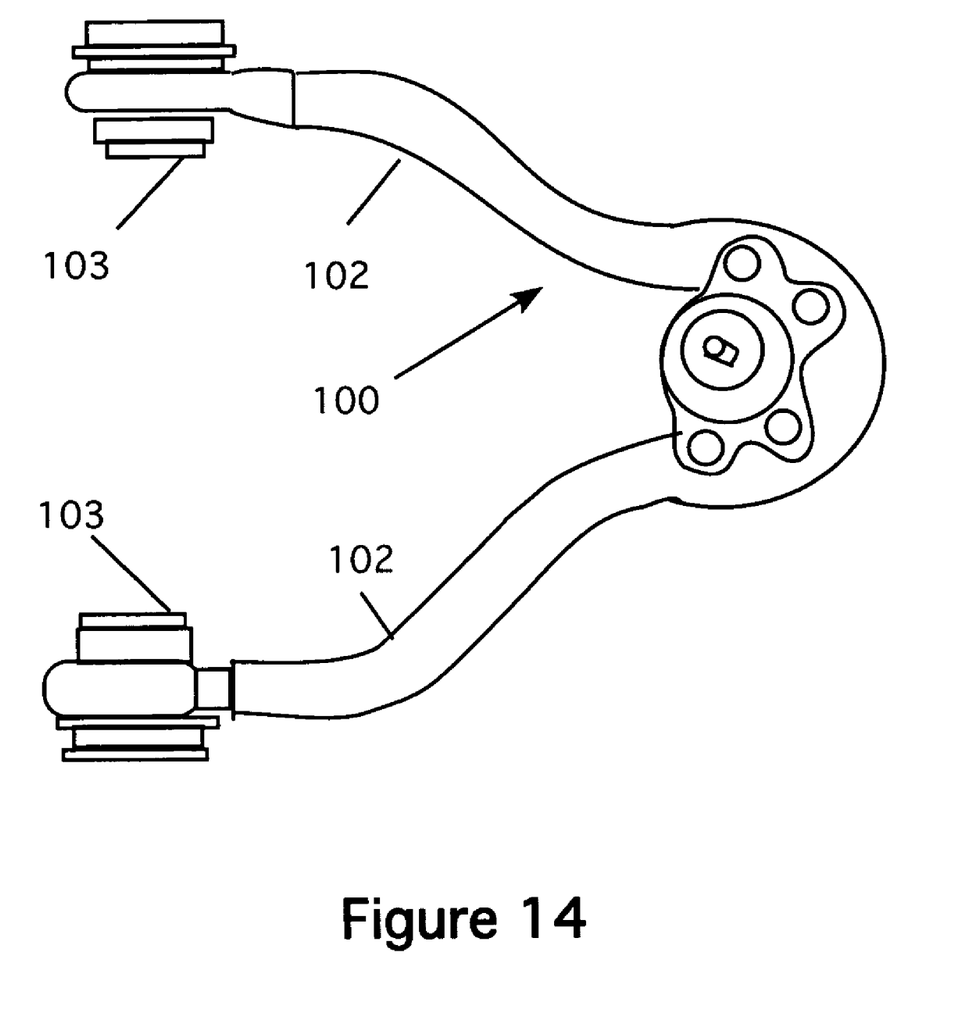
FIG. 14 is a top view of a typical vehicle control arm.

Referring now to FIGS. 14-17, the tool is designed to be placed between the vehicle's frame and a vehicle control arm that requires adjustment with the suspension loaded. FIG. 14 shows a typical control arm 100. It has two arms 102 with ends 103.

Figure 15:
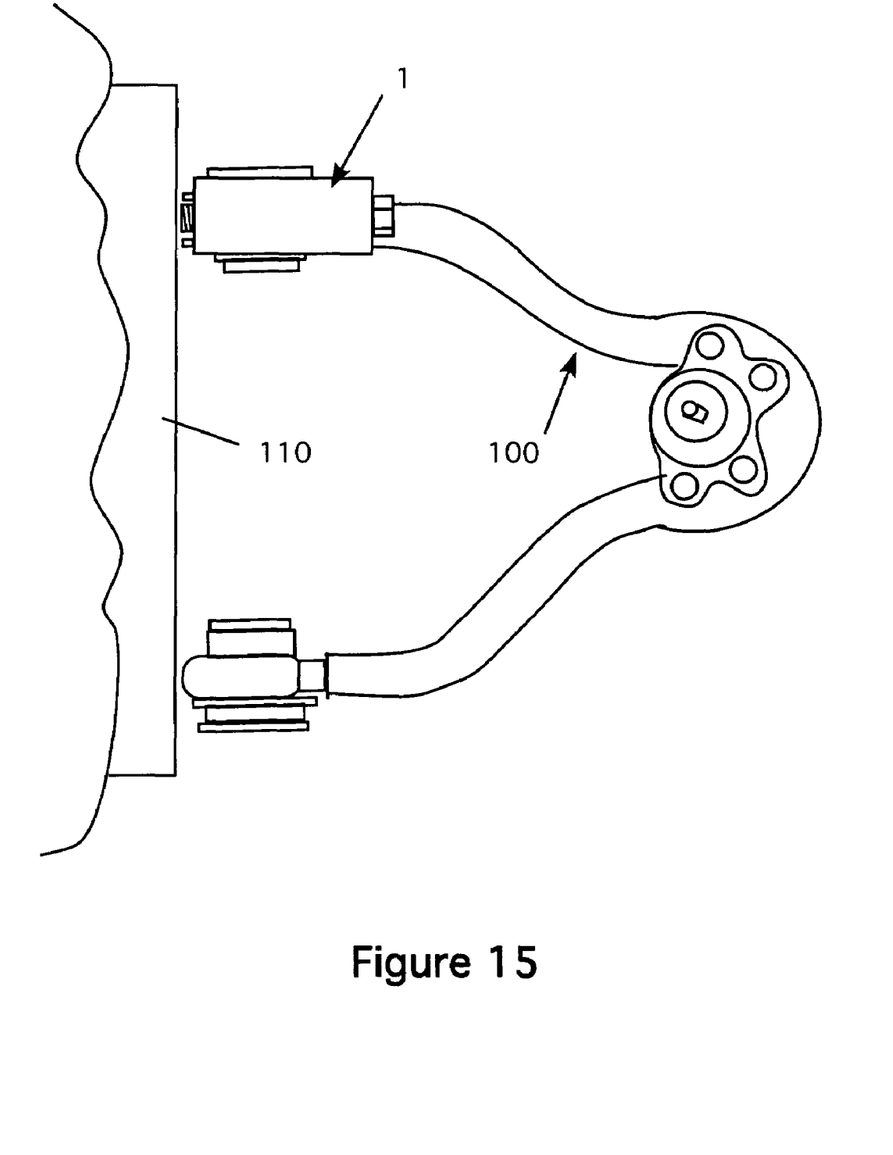
FIG. 15 is a top view of a typical vehicle control arm positioned against a frame member and showing the tool in place on the arm.
Figure 16:
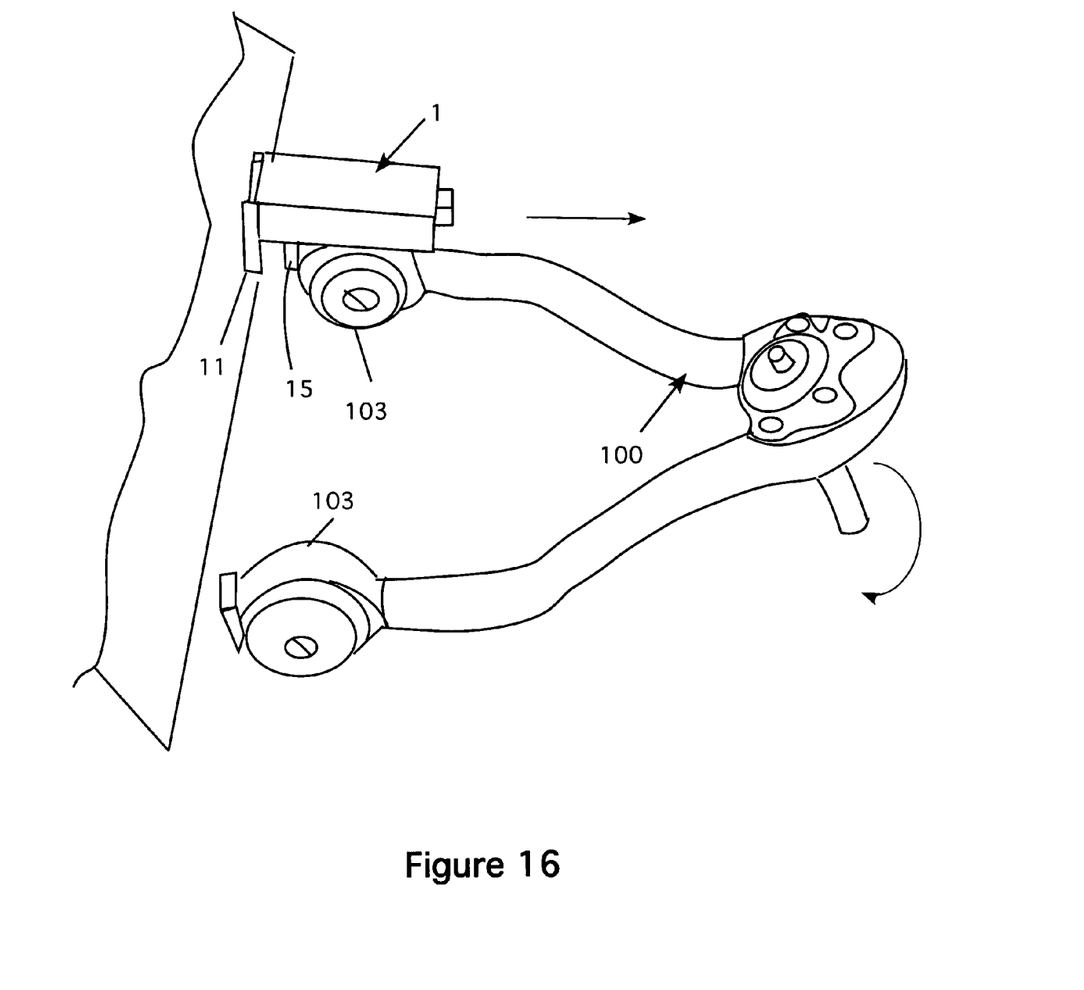
FIG. 16 is a perspective view of the control arm showing the tool pushing against a frame. This view shows the rotation of the control arm as the tool is used.

FIG. 15 shows the control arm 100 positioned against a frame 110. This figure also shows one tool 1 in place over one of the ends. FIG. 16 shows a perspective view of FIG. 15. Note that the fingers 11 rest against the frame 110, while the tongue 15 rests against the end 103. In use, the bolts that retain the control arm on the side where the tool is positioned are then loosened allowing the control arm to rest on the tool. The threaded rod (or bolt) on the tool is then tightened causing the tongue to push against the end of the control arm while the fingers push against the frame. This causes the control arm to be pushed away from the frame (as indicated by the arrows). Once the desired steering angles are reached, the control arm retaining bolts are tightened and the tool can be loosened and removed. Note that with one tool and only one side loosened, the control arm pivots as indicated by the arrows.

Figure 17:
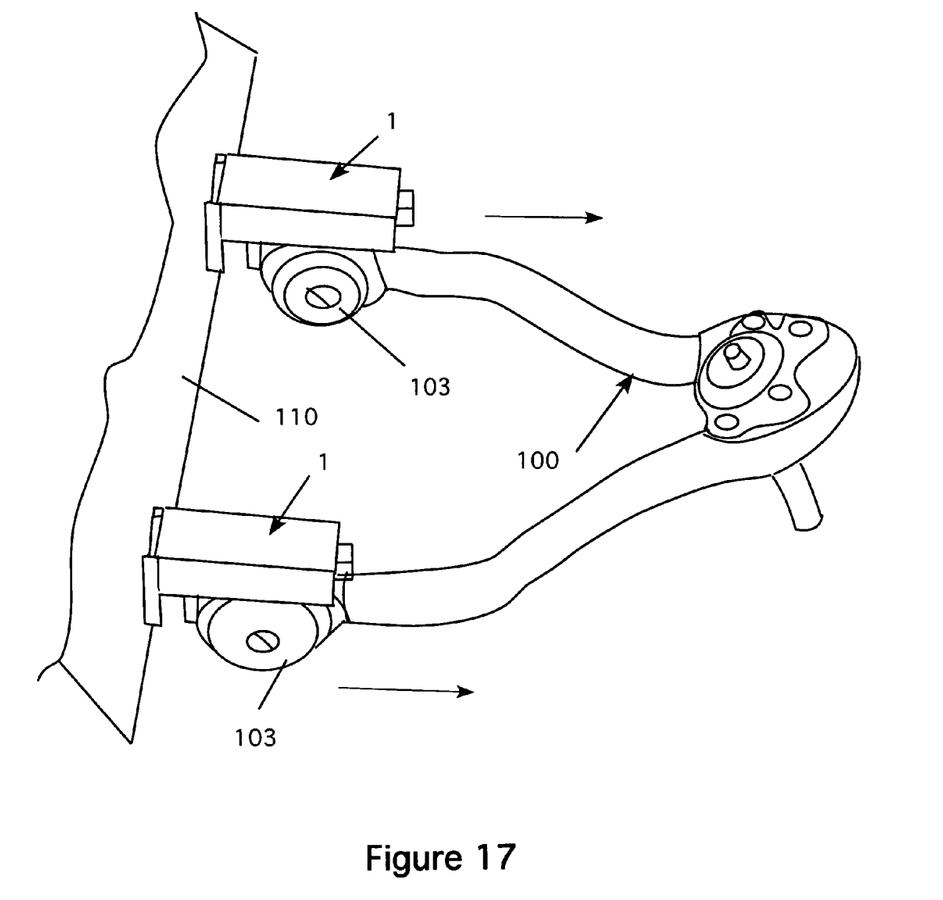
FIG. 17 shows an alternative method in which two tools are placed on the control arm as shown. The two tools are used to push the control arm in one direction as indicated.

As shown in FIG. 17, two tools can be used together (one tool on each end 103 of the control arm 100). In this situation, it is possible to adjust caster without affecting camber or vice versa. This is because both tools can push against the control arm simultaneously or each tool can be turned independently. In the case of FIG. 17, the tools are pushing on both ends of the control arm and they both move back (in the direction of the arrows.

Figure 18:
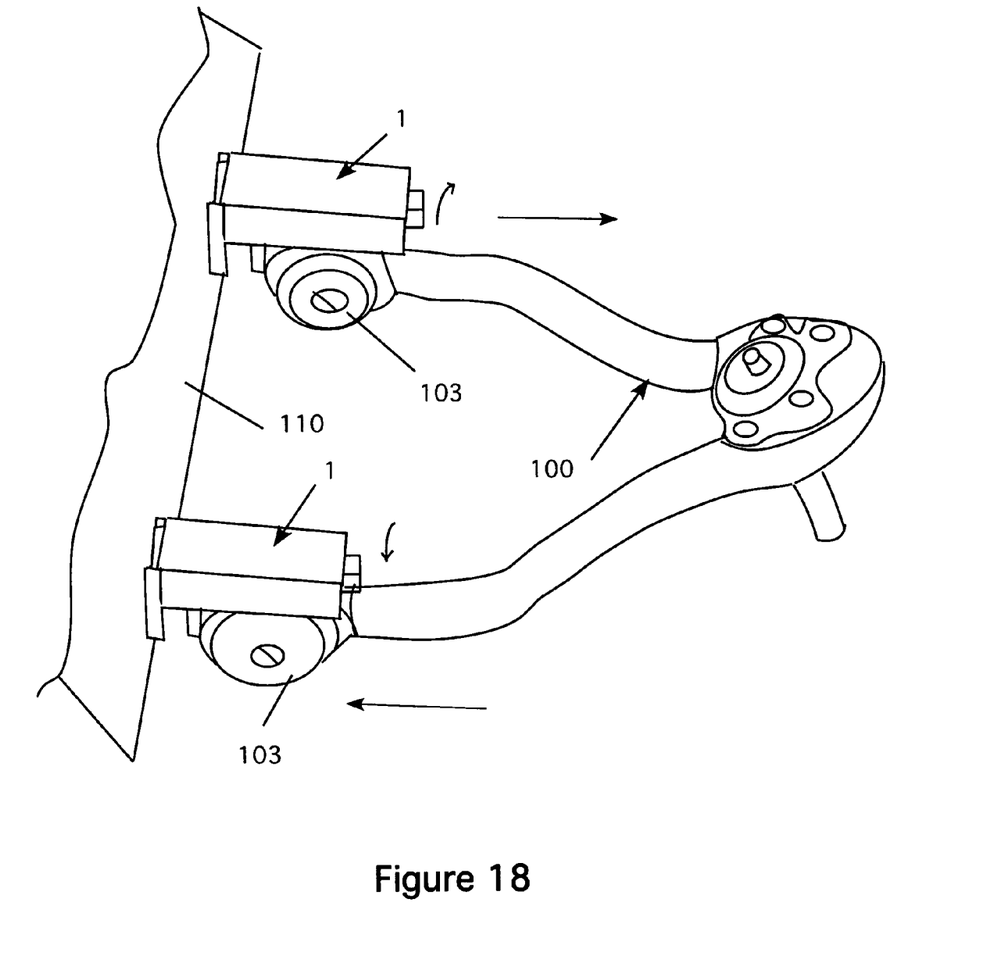
FIG. 18 shows another alternative method in which two tools are placed on the control arm as shown. The two tools are used to push the control arm in opposite directions as indicated.

FIG. 18 shows two tools being used with both control arm bolts loosened. One tool is turned clockwise while the other is turned counter clockwise. This causes the control arm to pivot as before, with both ends of the control being moved.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A tool for adjusting the camber and caster of a vehicle having at least one control arm, comprising:
   a) a housing having a first end and a second end, said housing being generally rectangular, said housing having a slot formed therein, said slot extending through said first end, forming an opening therein;
   b) a pair of fingers, formed on the first end of said housing and extending upwardly therefrom, said pair of fingers being positioned such that said slot lies between said pair of fingers in said first end of said housing;
   c) a sliding foot, slidably installed in said slot of said housing, said sliding foot having a tongue, extending upward therefrom; and
   d) a means for adjusting the position of said sliding foot within said slot of said housing; and
   e) a means for retaining said sliding foot in position within said housing.

2. The tool of claim 1 wherein the means for adjusting the position of said sliding foot comprises a threaded rod, threadably attached to said sliding foot and threadably engaged in said housing, whereby as said threaded rod is turned, said sliding foot slides within said slot of said housing.

3. The tool of claim 1 wherein the means for retaining said sliding foot in position within said housing comprise:
   a) at least one dovetail portion extending laterally from said slot into said housing; and
   b) a corresponding dovetail member formed on said sliding foot.

4. The tool of claim 1 wherein the means for retaining said sliding foot in position within said housing comprise:
   a) a groove formed in the bottom of said slot in said housing; and
   b) a corresponding tab formed on said sliding foot, whereby said tab is positioned in said groove when said sliding foot in positioned within said slot.

5. The tool of claim 1 wherein the tongue on said sliding foot extends upward at an angle of 80 degrees with respect to the bottom of said slot.

6. The tool of claim 1 wherein the tongue of said sliding foot passes between said pair of fingers on said housing.

7. The tool of claim 1 wherein said pair of fingers has gripping tips formed thereon.

8. A tool for adjusting the camber and caster of a vehicle having at least one control arm, comprising:
   a) a housing having a base, a pair of oppositely disposed side walls, forming a generally rectangular member having an open interior, a closed end and an open end being oppositely disposed from said closed end;
   b) a pair of fingers, formed on said pair of said oppositely disposed side walls at said open end of said housing and extending upwardly therefrom whereby each of said pair of fingers is positioned adjacent to said open interior such that said open end lies between said pair of fingers;
   c) a sliding foot, slidably installed in said open interior of said housing, said sliding foot having a tongue, extending upward therefrom; and
   d) a means for adjusting the position of said sliding foot within said slot of said housing; and
   e) a means for retaining said sliding foot in position within said housing.

9. The tool of claim 8 wherein the means for adjusting the position of said sliding foot comprises:
   a) a bolt, having a plurality of threads;
   b) a hole formed on said closed end of said housing, said bolt being passed through said hole in said closed end of said housing; and
   c) a threaded portion formed in said sliding foot, wherein said bolt is threadably engaged in said threaded portion of said sliding foot;
   d) whereby as said bolt is turned, said sliding foot slides within said slot of said housing.

10. The tool of claim 8 wherein the means for retaining said sliding foot in position within said housing comprise: at least one dovetail portion extending laterally from said open interior into said housing; and further wherein said sliding foot has a corresponding dovetail member formed thereon.

11. The tool of claim 8 wherein the means for retaining said sliding foot in position within said housing comprise:
   a) a groove formed in the base of said housing; and
   b) a corresponding tab formed on said sliding foot, whereby said tab is positioned in said groove when said sliding foot in positioned within said slot.

12. The tool of claim 8 wherein the tongue on said sliding foot extends upward at an angle of 80 degrees with respect to the base of said housing.

13. The tool of claim 8 wherein the tongue of said sliding foot passes between said pair of fingers on said housing.

14. The tool of claim 8 wherein said pair of fingers has gripping tips formed thereon.

15. The tool of claim 9 further comprising a means for removably holding said bolt in said closed end of said housing.

16. The tool of claim 15 wherein the means for removably holding said bolt in said closed end of said housing comprise:
   a) a washer, fixedly attached to said bolt in a spaced apart relation to a bolt head formed on the bolt; and
   b) a removable plate, formed in said closed end of said housing, wherein said removable plate has a curved surface formed therein to receive said bolt;
   c) whereby when said bolt is placed in said removable plate, the washer and bolt head are restrained from longitudinal movement in said housing by said removable plate.

17. The tool of claim 16 further comprising means for temporarily securing said removable plate to said housing.

* * * * *